United States Patent [19]

Simko et al.

[11] 4,446,830

[45] May 8, 1984

[54] METHOD OF OPERATING AN ENGINE WITH A HIGH HEAT OF VAPORIZATION FUEL

[75] Inventors: Aladar O. Simko, Dearborn Heights; Peter H. Havstad, Livonia, both of Mich.; Joseph A. Harrington, Naperville, Ill.

[73] Assignee: Ford Motor Company, Dearborn, Mich.

[21] Appl. No.: 465,858

[22] PCT Filed: Jan. 10, 1983

[86] PCT No.: PCT/US83/00029

§ 371 Date: Jan. 10, 1983

§ 102(e) Date: Jan. 10, 1983

[51] Int. Cl.³ .............................................. F02F 3/26
[52] U.S. Cl. .................................. 123/276; 123/262; 123/299; 123/1 A
[58] Field of Search ............... 123/262, 263, 276, 299, 123/300, 1 A

[56] References Cited

U.S. PATENT DOCUMENTS

| | | |
|---|---|---|
| 3,216,407 | 11/1965 | Eyzat . |
| 3,439,655 | 4/1969 | Eyzat . |
| 3,641,986 | 2/1972 | Fricker et al. . |
| 3,722,490 | 3/1973 | Araya et al. . |
| 3,908,624 | 9/1975 | Miyake et al. .................. 123/276 X |
| 3,999,532 | 12/1976 | Kornhauser .................... 123/276 X |
| 4,022,165 | 5/1977 | Eckert et al. . |
| 4,117,810 | 10/1978 | John . |
| 4,123,997 | 11/1978 | Oswald et al. . |
| 4,216,744 | 8/1980 | Oswald et al. . |

Primary Examiner—Parshotam S. Lall
Assistant Examiner—W. R. Wolfe
Attorney, Agent, or Firm—Robert E. McCollum; Clifford L. Sadler

[57] ABSTRACT

A method of operating an internal combustion engine of the spark ignition type with a fuel having a high latent heat of vaporization such as methanol by injecting the fuel in two stages, the first major portion of the fuel being injected at the start of the intake stroke into a bowl-in-piston cavity combustion chamber to be vaporized and atomized, the second smaller portion being injected late in the compression stroke just prior to ignition to remain close to the injector tip to richen the mixture adjacent the spark plug, and igniting the mixture.

7 Claims, 1 Drawing Figure

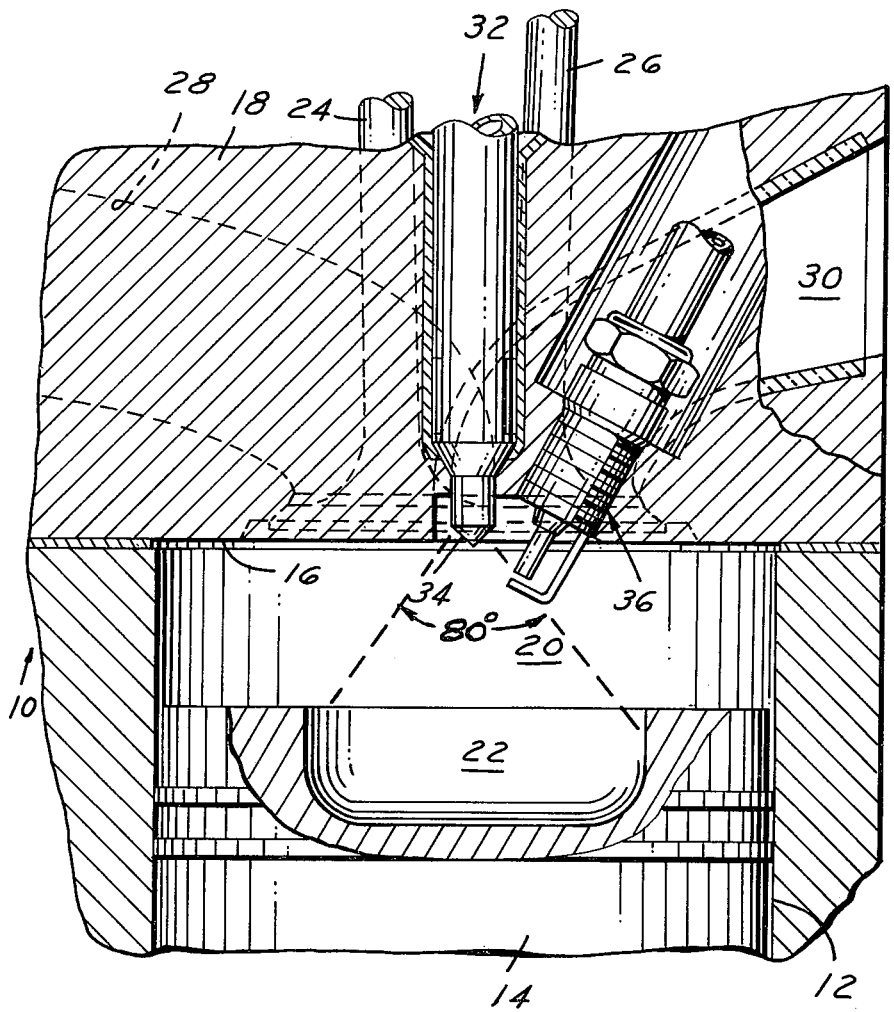

METHOD OF OPERATING AN ENGINE WITH A HIGH HEAT OF VAPORIZATION FUEL

This invention relates to a method of operating a spark ignition type internal combustion engine with a fuel having a high latent heat of vaporization such as methanol and the like. More particularly, it relates to a method of operating an engine in which the fuel is introduced in a first stage to evaporate and atomize the major portion of the fuel and subsequently in a second stage to provide a rich air/fuel mixture in the vicinity of the spark plug for rapid ignition.

Fuels having a high latent heat of vaporization have been proposed for use in automotive type internal combustion engines. Methanol is a prime candidate for alternate piston engine fuel because it has a high octane rating and is readily producible from coal. The drawbacks associated with methanol, however, are its high latent heat of evaporation, its low heat energy heat content, and its tendency to dilute the lubricating oil and thereby cause increased piston ring and cylinder bore wear.

Methanol can be introduced into the engine in a variety of ways. With carbureted methanol introduction, the high latent heat of vaporization causes difficulties in getting the fuel evenly distributed in the intake air as it flows through the intake system to the cylinders. The usual remedy for this is to apply a large amount of heating to the intake system to assist evaporation. However, liquid methanol droplets still enter the cylinder where they can precipitate on the cylinder walls resulting in the dilution of the lubricating oil, which leads to accelerated cylinder wall and piston ring wear.

Injection of the methanol in the intake manifold with multi-point injections is another possibility for fuel introduction. This method eliminates the cylinder-to-cylinder fuel distribution problem, but it does not eliminate the probability of oil dilution on the cylinder wall. In fact, it may increase the oil dilution problem relative to a carbureted methanol introduction because of the reduced time available for evaporation and because no exhaust heat is transferred to the methanol.

This invention relates to a method of operating an engine that overcomes the above shortcomings by providing a two-stage introduction of methanol to the engine combustion chamber. A part of the combustion chamber in this case includes a central cavity in the face of the piston within which the major portion of the fuel is sprayed to be contained for evaporation and atomization to thereby minimize cylinder wall wetting.

It is an object of this invention, therefore, to provide a method of operating an engine with fuel having a high latent heat of vaporization to reduce the output of emissions while improving the volumetric efficiency of the engine by cooling the intake charge as well as associated parts of the engine.

It is a further object of the invention to operate an engine as described above in which the fuel is injected in a plurality of stages to first adequately evaporate and atomize the major portion of the fuel with a minimum of wall wetting, and secondly to subsequently provide a rich air/fuel mixture in the vicinity of the spark plug at the time of ignition to assure consistent and fast flame initiation.

The use of methanol or other fuels having a high latent heat of vaporization in automotive type vehicles is known. For example, Oswald et al, U.S. Pat. No. 4,123,997 and U.S. Pat. No. 4,216,744, both disclose the use of 100% methanol in an engine that has a bowl-in-piston type combustion chamber in FIG. 2, a compression ratio of around 12:1 to the engine, and a spark plug that is located essentially near the center or axis of the combustion chamber. However, all of the fuel is injected at once and there is no description how cylinder wall wetting and consequent dilution of the lubricating oil is avoided.

John, U.S. Pat. No. 4,117,810, describes a device for mixing both gasoline and methanol for use in an engine, and no description is given of the combustion chamber or the method of operating the engine in a manner to avoid the problems described above.

Eckert et al, U.S. Pat. No. 4,022,165, describes a fuel injection system in which two separate fuel quantities are injected into the engine with a time lag between. Two separate fuel injection nozzles are used for injecting first a large quantity of fuel and subsequently a smaller quantity into the same cylinder during one engine working cycle. The large quantity of fuel is injected in a straight jet deep into the cylinder while the smaller quantity is introduced in the vicinity of the spark plug. However, no description of the combustion chamber operation is given nor any method disclosed as to the timing and motion of the air/fuel charge to avoid wall wetting and oil dilution.

Araya et al, U.S. Pat. No. 3,722,490, also discloses a two-stage fuel injection system with, however, the injection occuring first at a point near the end of the intake or expansion stroke and, secondly, at a point at the beginning of the compression stroke. This is unlike our method and would be unsatisfactory for overcoming the shortcomings mentioned above.

Eyzat, U.S. Pat. No. 3,216,407 and U.S. Pat. No. 3,439,655, both show mechanical constructions for providing a double injection of fuel into an internal combustion engine. The method of operating the engine, however, is unlike that of the invention to be disclosed.

Finally, Fricker et al, U.S. Pat. No. 3,641,986, shows only a bowl-in-piston type combustion chamber with tangential entry portions.

Other objects, features and advantages of the invention will become more apparent upon reference to the succeeding detailed description thereof, and to the single drawing illustrating schematically an engine construction utilizing the method of operation of the invention.

The sole FIGURE shows a cross section of a spark ignition internal combustion engine.

As stated above, the conventional shortcomings of using methanol or other fuels having a high latent heat of vaporization can be overcome by the application of a direct fuel injection concept utilizing a dual injection of the fuel in cooperation with a combustion chamber including a bowl-in-piston type cavity. Such a construction is illustrated schematically in the FIGURE, which shows a portion 10 of a spark ignition type internal combustion engine. It includes the usual cylinder block 12 within which is slidably mounted a piston 14 for cooperation with the face 16 of a cylinder head 18 to define a combustion chamber 20 between the two. In this case, piston 14 has a central cavity 22 defining a bowl-in-piston type construction. The cavity 22 would be designed to provide approximately 40-75% of the squish area, and the engine per se would operate at about a 13:1 compression ratio to make the best use of the methanol fuel.

The cylinder head 18 contains the usual intake and exhaust valves 24, 26. Valve 24 is supplied with air through an inlet passage 28 that would be designed for a moderate rate of swirl. The exhaust gases exit through an outlet passage 30 that could be lined with ceramic or sheet metal for better heat conservation purposes.

The fuel injector, indicated schematically at 32, is centrally located in cylinder head 18 to project its nozzle 34 essentially into the center of combustion chamber 20 over cavity 22. The injector would be of a known type, and its details of construction and operation, therefore, are not given. Suffice it to say that in this case the pump system supplying the nozzle 34 would operate at a moderate pressure level (260 psi opening pressure for the injector), and the nozzle per se would be designed to provide a conical fuel spray with reasonably good atomization and relatively low penetration characteristics, for a purpose to be described.

A spark plug 36 is located as close to the center of the combustion chamber as possible to project its electrodes adjacent the tip of the fuel injection nozzle 34, as indicated.

The piston 14 is illustrated in a position after the engine has rotated through a crank angle of approximately 65° after top dead center position. Also illustrated is a conical spray angle of approximately 80° for the fuel from injection nozzle 34, as indicated by the dot/dash lines. If fuel is injected when piston 14 is near the top dead center position, it will be clear that substantially all of the fuel injected will pass directly into cavity 22 and not wet the cylinder walls. If only a small amount of fuel is injected, it will be contained near the tip of nozzle 34 and adjacent the spark plug electrodes to provide a rich air/fuel mixture in this area for ignition.

A key feature of the invention is the unique timing of the fuel injection to provide initially a large charge of fuel sufficiently prior to ignition so it can be evaporated and atomized, and a secondary charge at a time and location to provide a dependable ignition of the air/fuel charge.

More particularly, the engine operates with a combustion method as follows. As the engine begins its intake stroke, the opening of intake valve 24 will provide an induction of air or gas into the combustion chamber 20 with a moderate swirling motion. As piston 14 begins its downward descent from its top dead center position, a first large (approximately 75-90% of the total) charge of fuel will be injected from nozzle 34 into combustion chamber 20. As stated previously, since piston 14 is near its top dead center position at the start of the intake stroke, this total charge of fuel will be directed into the cavity 22 in piston 14. The incoming swirling air will pass into cavity 22 to evaporate and finely atomize the fuel. The fuel will be injected at a fast rate for a short duration to be completed approximately by the time piston 14 reaches the position indicated in the FIGURE. That is, injection of the first portion of fuel is terminated between about 50°-60° after top dead center position at the start of the intake stroke. As a result, during the remainder of the intake stroke, as piston 14 descends and additional swirling air enters the cylinder through the open intake valve 24, the evaporated as well as finely atomized fuel mist will disperse from cavity 22 outwardly to the rest of the cylinder space 20. This arrangement makes it unlikely for large fuel droplets to contact the cylinder walls because they would be centrifuged out to the chamber wall inside the combustion cavity 22 where they will absorb heat from the chamber wall as they evaporate. The evaporation of airborne fuel during this intake stroke also cools the intake charge and thus improves the volumetric efficiency of the engine. The cooler intake temperature also results in overall lower cycle temperatures that improve the thermal efficiency and reduce the oxides of nitrogen (NOx) that would be formed during the combustion.

The evaporation and misting of the fuel by the incoming air and exhaust gases continues through the intake stroke. Thereafter, during the later part of the compression stroke, at about a 30°-50° location before top dead center position of the piston, a second smaller (10-25%) portion of the total fuel charge is injected through nozzle 34. The penetration of such small fuel quantity is low; therefore, most of this fuel remains in the vicinity of the tip of injector nozzle 34 to enrichen the air/fuel ratio in the vicinity of spark plug 36 just prior to ignition. This assures consistent and fast flame initiation, and facilitates lean operation at part loads with high amounts of exhaust gas recirculation (EGR) for high efficiency coupled with NOx control. Combustion then is initiated by the spark plug.

If all of the methanol were injected late in the compression stroke, the heat required for evaporation would be extracted mostly from the heat of the compressed gas; therefore, a significant thermodynamic efficiency loss would be incurred. The latent heat of evaporation of methanol is approximately 5% of its heating value; thus extraction of this heat from the compressed gas would be equivalent to a loss of 5% of the heating value of the fuel. Direct cylinder injection throughout the intake stroke and/or during the early part of the compression stroke avoids this loss, but it has the disadvantage of cylinder wall wetting and its associated piston ring and cylinder bore wear. This invention eliminates the above problems by a two-stage fuel injection into a bowl-in-piston type combustion chamber that atomizes and evaporates the fuel in a manner providing good volumetric efficiency. At the same time, the heat necessary for evaporation is taken from the surrounding cylinder wall and piston surfaces, which cools the same; also from the incoming charge of air or gas, which again improves the volumetric and thermal efficiencies.

From the foregoing, it will be seen that the invention provides a method of operating an automotive type internal combustion engine with a fuel having a high latent heat of vaporization so that the fuel does not wet the cylinder surfaces, and the heat required for evaporation is taken from the inducted air and the piston surfaces. Cooling of the inducted air improves the volumetric and thermal efficiencies and reduces NOx formation. Cooling of the piston improves its durability and facilitates supercharging of an engine without having to resort to excessive and costly piston cooling measures. Furthermore, good mechanical atomization of the fuel directly in the cylinder as provided by this invention eliminates the need to apply intake heat, yet it assures good fuel distribution. The direct fuel injection of the major portion of the fuel with the specified timing method described minimizes the probability of methanol diluting the oil film on the cylinder wall. Also, the second stage injection of a smaller quantity of fuel just prior to ignition facilitates operation of the engine with a lean mixture and a high EGR rate without endangering ignitability.

While the invention has been shown and described in its preferred embodiment, it will be clear to those skilled in the arts to which it pertains that many changes and modifications may be made thereto without departing from the scope of the invention.

We claim:

1. A method of operating an internal combustion engine of the spark ignition type with a neat fuel having a high heat of vaporization, comprising:

charging the combustion chamber defined between the cylinder head and the top of the piston having a central cavity therein with a volume of air having a moderate swirl rate induced by the intake system;

injecting a first portion of the total fuel charge having a high heat of vaporization such as methanol and the like into the chamber shortly after top dead center (TDC) position of the piston at the start of the intake stroke so that essentially all of the first portion fuel charge is injected into the piston cavity;

injecting at moderate pressure levels with a conical spray pattern producing relatively low penetration and at such a fast rate and for such a short duration that the injection of the first fuel portion is terminated shortly after the start of injection and while still within the intake stroke;

continuing the induction of air into the chamber as the piston continues to descend during the intake stroke so that additional swirling air enters the chamber and cavity to effect evaporation and misting of the fuel charge and movement of the fuel charge from the cavity to the rest of the chamber whereby the heavier fuel droplets are centrifuged to the cavity walls to be contained therein and absorb the heat from the walls and the incoming air to cool the same;

injecting the remaining portion of the total fuel charge into the chamber during the later part of the compression stroke of the engine just prior to ignition with low penetration to assure a rich air/fuel mixture adjacent the spark plug; and igniting the mixture.

2. A method as in claim 1, wherein the first portion of the fuel charge injected constitutes approximately 75–90% of the total fuel charge, the small amount of the remaining fuel portion later injected with low penetration causing the later injected portion to remain in the vicinity of the injector tip to richen the air/fuel mixture at that location for ignition.

3. A method as in claim 1, wherein the first and later injected fuel portions are injected through the same fuel injection nozzle.

4. A method as in claim 1, wherein the later injected fuel portion is injected when the piston is within approximately 30–50% before TDC position.

5. A method as in claim 1, wherein the injection of the first portion of fuel is terminated approximately within 60° crakangle after TDC position of the piston during the intake stroke of the piston.

6. A method as in claim 1, wherein combustion is initiated by a spark plug located near the center of the chamber and near the top of the injector nozzle to be adjacent to the rich mixture after injection of the remaining fuel portion.

7. A method as in claim 1, wherein the cavity has a squish area of approximately 40–75% of the total squish area of the chamber.

* * * * *